(12) United States Patent
Tahk

(10) Patent No.: US 7,436,565 B2
(45) Date of Patent: Oct. 14, 2008

(54) LASER SCANNING DEVICE

(75) Inventor: Gyung-mo Tahk, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/385,763

(22) Filed: Mar. 22, 2006

(65) Prior Publication Data

US 2006/0285188 A1   Dec. 21, 2006

(30) Foreign Application Priority Data

Jun. 16, 2005   (KR) .................... 10-2005-0051822
Aug. 17, 2005  (KR) .................... 10-2005-0075440

(51) Int. Cl.
*G02B 26/08* (2006.01)

(52) U.S. Cl. .................................................. 359/216

(58) Field of Classification Search .......... 359/216–218
See application file for complete search history.

(56) References Cited

U.S. PATENT DOCUMENTS 5,046,797 A * 9/1991 Kurisu et al. ................ 359/217
5,675,200 A * 10/1997 Hayashi ........................ 310/90
6,029,028 A *  2/2000 Inoue .......................... 399/92

FOREIGN PATENT DOCUMENTS

| JP | 01-196018 | 8/1989 |
|---|---|---|
| JP | 05-072495 | 3/1993 |
| JP | 06-308411 | 11/1994 |
| JP | 08-271823 | 10/1996 |
| JP | 11-183836 | 7/1999 |
| JP | 11-264949 | 9/1999 |
| JP | 11-264950 | 9/1999 |

* cited by examiner

*Primary Examiner*—Euncha P Cherry
(74) *Attorney, Agent, or Firm*—Roylance, Abrams, Berdo & Goodman, L.L.P.

(57) ABSTRACT

A laser scanning device includes a device body, and a rotating polygonal mirror rotatably mounted in the device body and deflecting light projected from a light source. A cover member is mounted in the device body to cover the rotating polygonal mirror. The cover member has a slit for transmitting the light and an influent hole for letting external air flow in, and forms an air current rotating and descending at high speed around the rotating polygonal mirror. A dust collection member filters off dust included in the air flowing into the cover member through the influent hole by the air current generated in the cover member.

20 Claims, 7 Drawing Sheets

LASER SCANNING DEVICE

CROSS-REFERENCE TO RELATED APPLICATIONS

This application claims the benefit under 35 U.S.C. § 119(a) of Korean Patent Applications No. 2005-51822 filed on Jun. 16, 2005 and No. 2005-75440 filed on Aug. 17, 2005, in the Korean Intellectual Property Office, the entire disclosures of both of which are hereby incorporated by reference.

BACKGROUND OF THE INVENTION

1. Field of the Invention

The present invention relates to a laser scanning device deflecting an incident light in a predetermined direction.

2. Description of the Related Art

Generally, image forming apparatuses, such as a laser printer, a photocopier, a scanner, and a multifunction apparatus, have a laser scanning device.

In the laser scanning device, a light projected from a light source is deflected in a predetermined direction by a specular surface of a rotating polygonal mirror that is rotated at a high speed. The deflected light passes through a predetermined optical system and enters a photoconductive medium, such as a photoconductive drum.

As the image forming apparatus tends toward high-speed performance, rotational speed of the rotating polygonal mirror increases. When the rotating polygonal mirror is rotated at a high speed, ambient air of the rotating polygonal mirror, which contains inner dust, generates a fast air current in a main body of the laser scanning device. Therefore, the dust scattered by the air current may attach to the specular surface. When the specular surface is thus contaminated, optical reflexibility decreases, accordingly deteriorating optical deflection.

Some of the laser scanning devices further include a light-blocking unit to prevent the light from being unintentionally projected to the outside during maintenance of the apparatus or by malfunctioning of the apparatus. However, the conventional light-blocking unit having a plurality of parts, such as a resilient member, a shutter, and a driving motor, requires a complicated structure and a dedicated driving source.

Accordingly, a need exists for a laser scanning device that substantially prevents contamination of a rotating polygonal mirror.

SUMMARY OF THE INVENTION

According to an exemplary embodiment of the present invention, a laser scanning device is capable of substantially preventing contamination of a rotating polygonal mirror by dust entrained to an air current generated while rotating the polygonal mirror.

Another aspect of the present invention is to provide a laser scanning device capable of automatically substantially preventing light from being projected to the outside unintentionally using the air current without requiring a dedicated driving source.

According to an exemplary embodiment of the present invention, a laser scanning device includes a device body, and a rotating polygonal mirror rotatably mounted in the device body and deflecting a light projected from a light source. A cover member is mounted in the device body to cover the rotating polygonal mirror. The cover member has a slit for transmitting light and an influent hole for letting external air flow in, and for forming an air current rotating and descending at high speed around the rotating polygonal mirror. A dust collection member filters off dust included in the air flowing into the cover member through the influent hole by the air current generated in the cover member.

The cover member has a substantially dome shape having an inner diameter increasing from an upper part toward a lower part, which is vertically non-symmetrical.

The cover member includes a plurality of connection ribs at a lower end thereof for connection with a bottom surface of the device body.

The bottom surface of the device body includes a circuit board controlling a driving motor that rotates the rotating polygonal mirror.

The cover member includes at the lower end thereof a first step part for forming a gap between the cover member and the bottom surface of the device body, and a second step part for forming a gap between the cover member and the circuit board.

The second step part is disposed to correspond to a corner of the circuit board.

The influent hole has a seating portion for receiving the dust collection member along a circumference thereof.

The dust collection member is a porous substance.

According to another exemplary embodiment of the present invention, a laser scanning device includes a device body, and a rotating polygonal mirror rotatably mounted in the device body and deflecting a light projected from a light source. A cover member is mounted in the device body to cover the rotating polygonal mirror. The cover member has a slit for transmitting light and an influent hole for letting external air flow in and for forming an air current rotating and descending at high speed around the rotating polygonal mirror. A light-blocking unit is operated by the air current generated in the cover member, thereby opening and closing the slit.

The light-blocking unit includes a blocking plate disposed on a projection path of the light. A rotary shaft is connected to the blocking plate and hingedly connected to the cover member by both ends thereof.

The cover member has a substantially dome shape having an inner diameter increasing from an upper part toward a lower part, which is vertically non-symmetrical.

The cover member has a plurality of connection ribs at a lower end thereof for connection with a bottom surface of the device body.

The bottom surface of the device body includes a circuit board controlling a driving motor that rotates the rotating polygonal mirror.

The cover member includes at the lower end thereof a first step part for forming a gap between the cover member and the bottom surface of the device body. A second step part forms a gap between the cover member and the circuit board.

The second step part is disposed to correspond to a corner of the circuit board.

According to yet another exemplary embodiment of the present invention, a laser scanning device includes a device body, and a rotating polygonal mirror rotatably mounted in the device body and deflecting a light projected from a light source. A cover member is mounted in the device body to cover the rotating polygonal mirror. The cover member has a slit for transmitting the light and an influent hole for letting external air flow in and for forming an air current rotating and descending at high speed around the rotating polygonal mirror. A light-blocking unit is operated by the air current generated in the cover member, thereby opening and closing the slit. A dust collection member filters off dust included in the air flowing into the cover member through the influent hole.

The influent hole has a seating portion for receiving the dust collection member along a circumference thereof.

The dust collection member is a porous substance.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWING FIGURES

The above aspect and other features of the present invention will become more apparent by describing in detail exemplary embodiments thereof with reference to the attached drawing figures, wherein.

Throughout the drawings, the same drawing reference numerals will be understood to refer to the same elements, features, and structures.

DETAILED DESCRIPTION OF THE EXEMPLARY EMBODIMENTS

Hereinafter, certain exemplary embodiments of the present invention are described in detail with reference to the accompanying drawing figures.

The matters defined in the detailed description, such as a detailed construction and elements thereof, are provided to assist in a comprehensive understanding of the invention. Thus, it is apparent that the present invention may be carried out without those defined matters. Also, well-known functions or constructions are omitted to provide a clear and concise detailed description.

Figure 1:
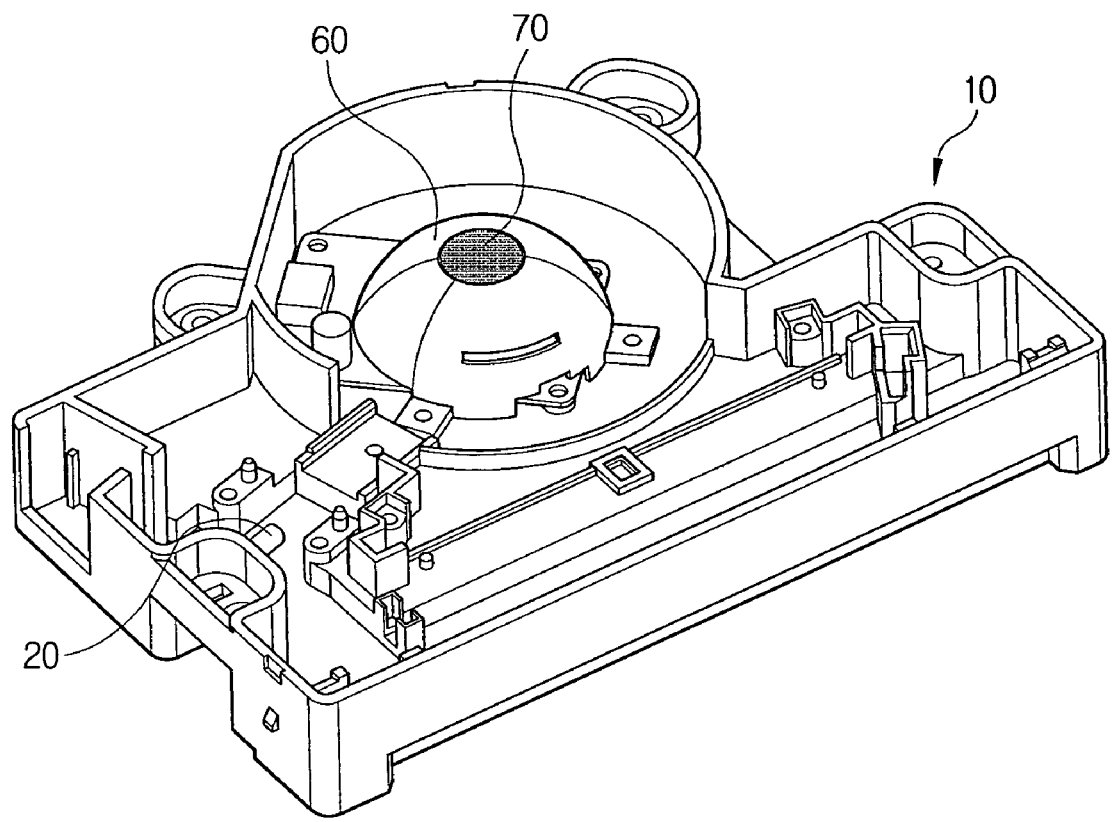
FIG. 1 is a perspective view of a laser scanning device according to an exemplary embodiment of the present invention.
Figure 2:
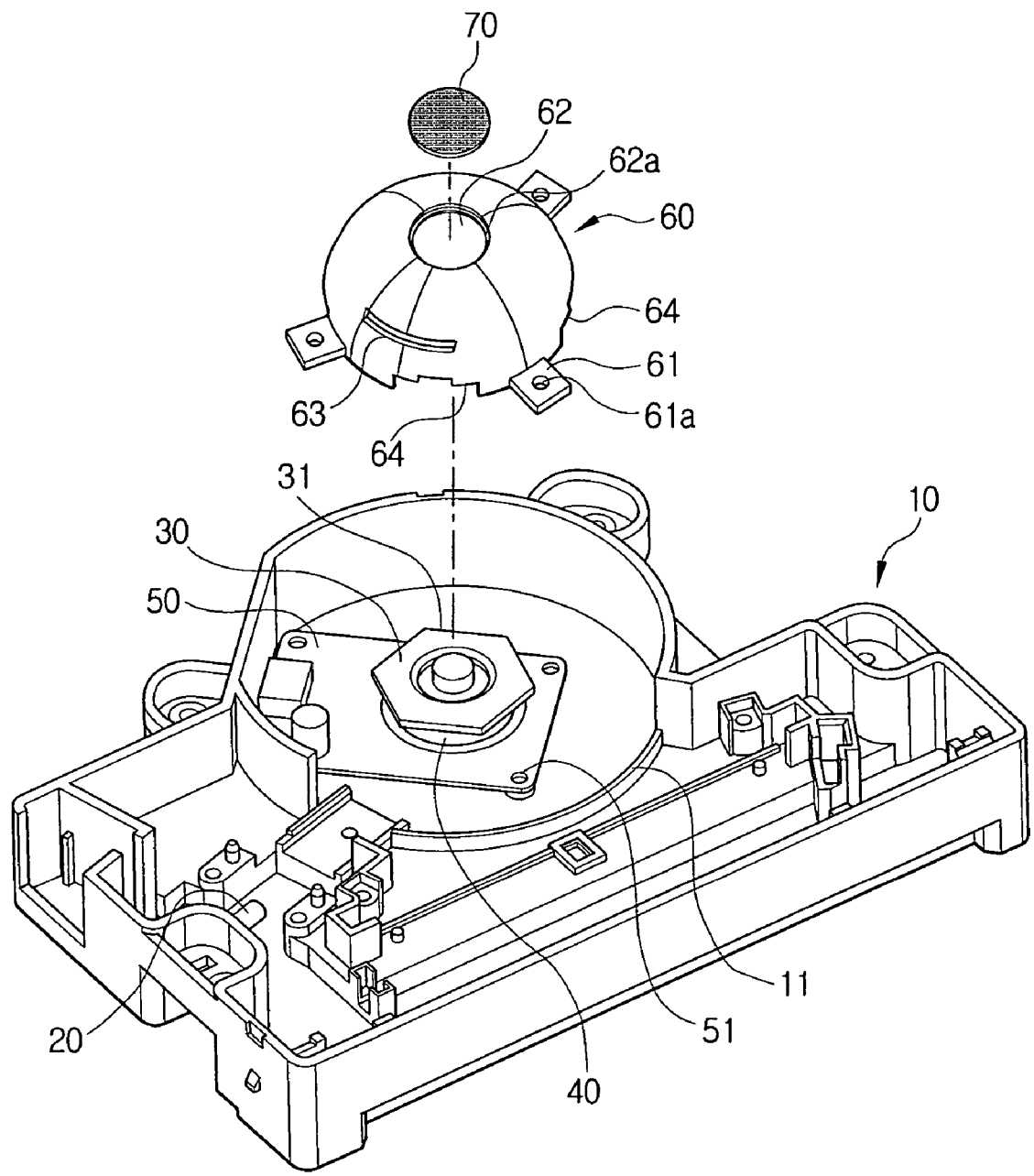
FIG. 2 is an exploded perspective view of the laser scanning device of FIG. 1.

Referring to FIGS. 1 and 2, a laser scanning device according to an exemplary embodiment of the present invention includes a device body 10, a light source 20 mounted in the device body 10, and a rotating polygonal mirror 30 deflecting a light projected from the light source 20. A driving motor 40 rotates the rotating polygonal mirror 30. A circuit board 50 controls the driving motor 40. A cover member 60 covers the rotating polygonal mirror 30, and has a dust collection member 70 connected thereto.

The main body 10 is formed as a general cabinet or a housing and is mounted in a main body of the image forming apparatus. The device body 10 includes a plurality of optical members and is preferably covered by a cover (not shown) to substantially prevent inflow of foreign substances.

The light source 20 includes a semiconductor laser diode projecting a light toward the rotating polygonal mirror 30. The light source 20 is turned on and off under the control of a control unit (not shown), thereby projecting the light for scanning of a photoconductive medium, such as a photoconductive drum.

Optical members, for example, a collimating lens (not shown) and a cylinder lens (not shown), are sequentially arranged between the light source 20 and the rotating polygonal mirror 30. The collimating lens converts the projected light to a parallel light or a convergent light. A slit (not shown) is disposed in front of the collimating lens to restrict the light passing through the collimating lens. The cylinder lens focuses the light passed through the collimating lens on a specular surface of the rotating polygonal mirror 30. Therefore, the light passed through the cylinder lens enters one side of the rotating polygonal mirror 30 at substantially the same angle.

The rotating polygonal mirror 30 includes a plurality of specular surfaces 31 on the outside thereof to deflect the lights from the light source 20 toward a predetermined destination, for example, the photoconductive drum. Being supported and rotated by the driving motor 40 at high speed, the rotating polygonal mirror 30 is able to vary positions of the specular surfaces with respect to the incident lights, thereby deflecting the lights.

The driving motor 40 is mounted on the circuit board 50. Being controlled by the circuit board 50, the driving motor 40 controls rotational speed of the rotating polygonal mirror 30. The circuit board 50 is fixed in tight contact with a bottom surface 11 of the device body 10.

Optical guide members (not shown) are further provided to guide the lights deflected from the rotating polygonal mirror 30 to the predetermined destination. More specifically, an f·θ lens and a reflective mirror may be provided to eventually focus the lights deflected from the rotating polygonal mirror 30 onto a final destination. Because the above optical guide members are generally used in conventional laser scanning devices, detailed descriptions thereof are omitted herein.

The cover member 60 is mounted in the device body 10 to cover the rotating polygonal mirror 30. The cover member 60 has a substantially hemispheric shape, that is, a dome-shaped. Therefore, the cover member 60 has a non-symmetric structure in a vertical direction. More specifically, an inner diameter of the cover member 60 increases from an upper part toward a lower part. Additionally, the cover member 60 partly covers the circuit board 50 and the bottom surface 11 of the device body 10 as well as the rotating polygonal mirror 30. For this, the cover member 60 includes a plurality of connection ribs 61 at a lower end thereof. In the exemplary embodiment shown in FIGS. 2 and 3, three connection ribs 61 are provided. The connection ribs 61 are preferably disposed at positions for connection with the bottom surface 11 of the device body 10 in tight contact with the bottom surface 11 such that the cover member 60 covers the rotating polygonal mirror 30. Each of the connection ribs 61 has a screw hole 61a.

An influent hole 62 is formed at a ceiling of the cover member 60 to let the external air flow in. One or more influent holes 62 may be formed at the ceiling of the cover member 60 in a circular or polygonal form. Preferably, one circular influent hole 62 is formed substantially at the center of the cover member 60, as shown in FIGS. 1 and 2. The external air flows into the cover member 60 through the influent hole 62 by an air current generated by high-speed rotation of the rotating polygonal mirror 30. Because the cover member 60 has a substantially dome-shape and the influent hole 62 is formed at the ceiling of the cover member 60, the air flowing into the cover member 60 has different flowing properties such as pressure, speed, and direction between the upper part and the lower part inside the cover member 60.

Additionally, a slit 63 is provided in the cover member 60 to transmit light deflected by the rotating polygonal mirror 30. The slit 63 has a predetermined width in a vertical direction and a predetermined length in a lateral direction. The air flowing in through the influent hole 62 exits to the outside through the slit 63 and accordingly, the flowing properties (pressure, speed, direction) of the air current generated in the cover member 60 by rotation of the rotating polygonal mirror 30 are changed.

Figure 3:
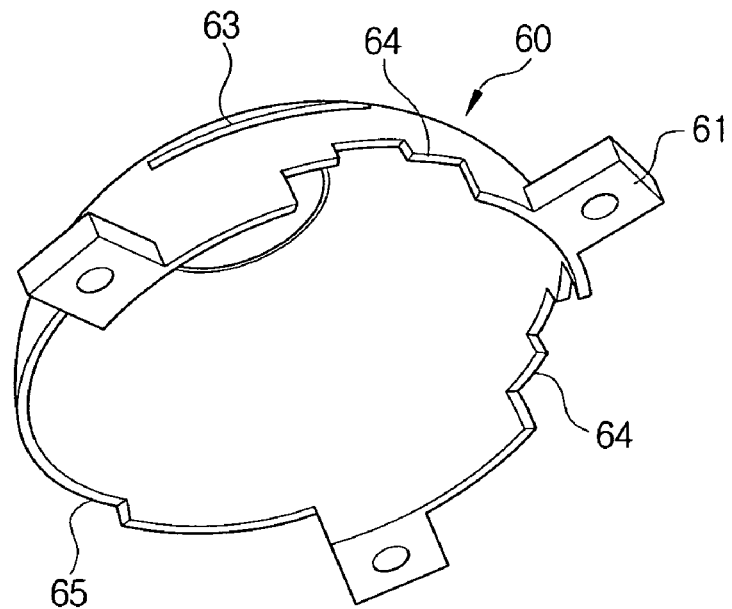
FIG. 3 is a bottom-perspective view of a cover member of FIG. 2.
Figure 4:
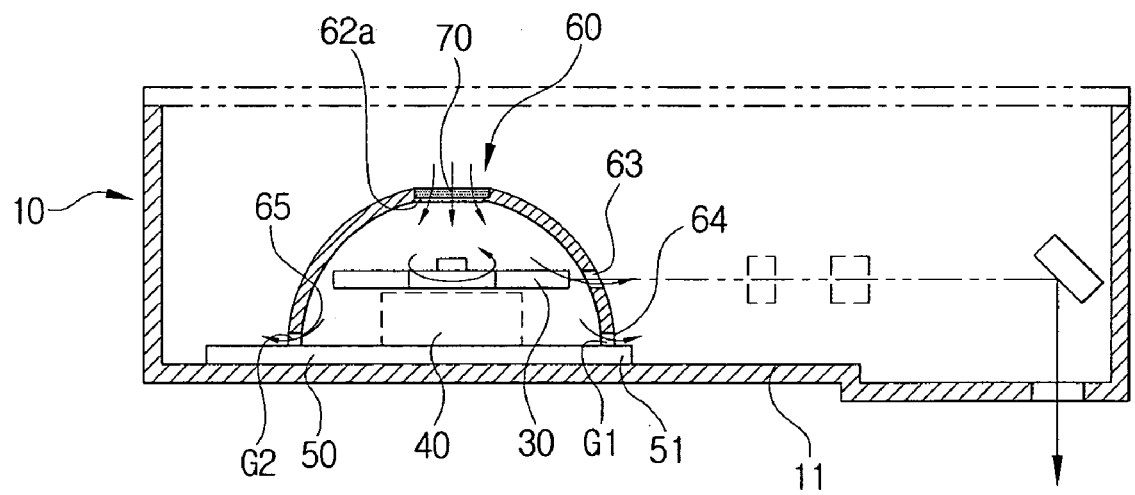
FIG. 4 is a schematic view of a laser scanning device according to an exemplary embodiment of the present invention.

As shown in FIG. 3, a pair of first step parts 64 and one second step part 65 are formed at the lower end of the cover member 60. The first step parts 64 are disposed at positions corresponding to corners 51 of the circuit board 50 when mounting the cover member 60 to the device body 10. Therefore, the first step parts 64 prevent interference between the corners 51 of the circuit board 50 and the cover member 60, as shown in FIG. 4. Additionally, a first gap G1 may be formed between the first step parts 64 and the corners 51. The second step part 65 is disposed at a position covering the circuit board 50 so that a second gap G2 may be formed between the circuit board 50 and the lower end of the cover member 60.

When the cover member 60 is mounted in the device body 10, the gaps G1 and G2 are generated by the first and the second step parts 64 and 65. Therefore, the air current generated in the cover member 60 by rotation of the rotating polygonal mirror 30 is guided downwardly due to the hemispheric configuration of the cover member 60. Then, part of the air current exits through the slit 63 and the other part through the gaps G1 and G2.

The dust collection member 70 filters off dust included in the air that flows into the cover member 60 through the influent hole 62. For this purpose, the dust collection member 70 may be made of a porous material, such as sponge or a general air filter, for filtering off the dust and passing the air therethrough. The dust collection member 70 may be simply received in a seating portion 62a formed along a circumference of the influent hole 62 or be fixed by adhesive. The seating portion 62a may include a circular rib flanged from the circumference of the influent hole 62.

As shown in FIG. 4, in the laser scanning device according to an exemplary embodiment of the present invention, as the rotating polygonal mirror 30 rotates at high speed, the external air flows in through the influent hole 62 of the cover member 60. Because the external air is filtered by the dust collection member 70, only cleaned air flows into the cover member 60. The air flowing into the cover member 60 is guided from the upper part to the lower part due to the hemispheric shape of the cover member 60. Then, part of the air exits to the outside of the cover member 60 through the slit 63. The other part of the air is guided to the lower part of the cover member 60 and discharged out through the gaps G1 and G2. As described above, the air current in the cover member 60 does not stay at any one place because of the different flowing properties (pressure, speed, direction) between the upper part and the lower part. Accordingly, although the air current still includes some fine dust that is not filtered by the dust collection member 70, the fine dust does not easily attach to the rotating polygonal mirror 30.

As the air discharged out of the cover member 60 through the gaps G1 and G2 flows back in through the influent hole 62 and repeats this circulation, the dust included in the air is mostly filtered off by the dust collection member 70. Therefore, dust floating in the device body 10 may be reduced, thereby substantially preventing contamination of the optical members.

Figure 5:
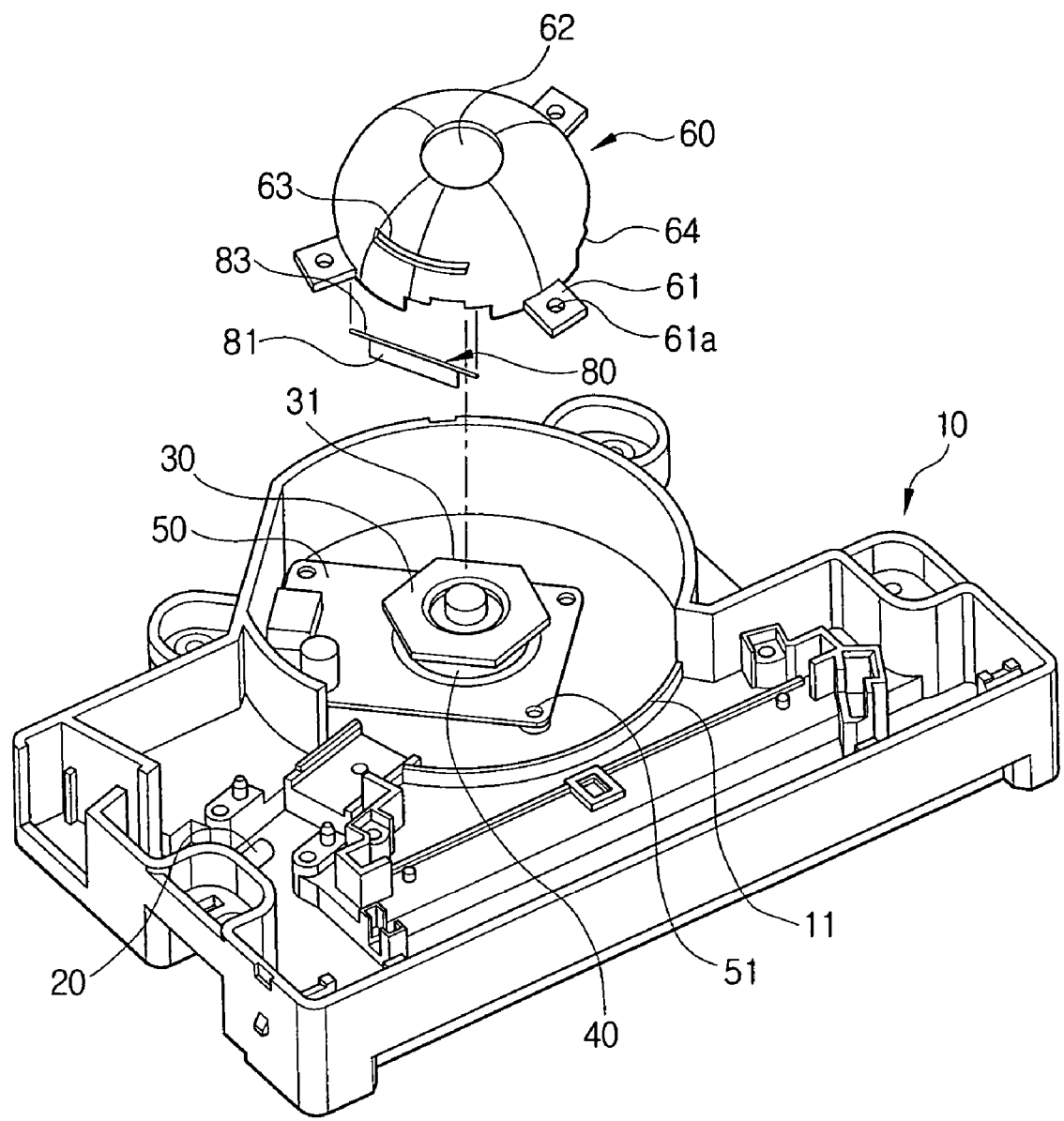
FIG. 5 is an exploded perspective view of a laser scanning device according to another exemplary embodiment of the present invention.
Figure 6:
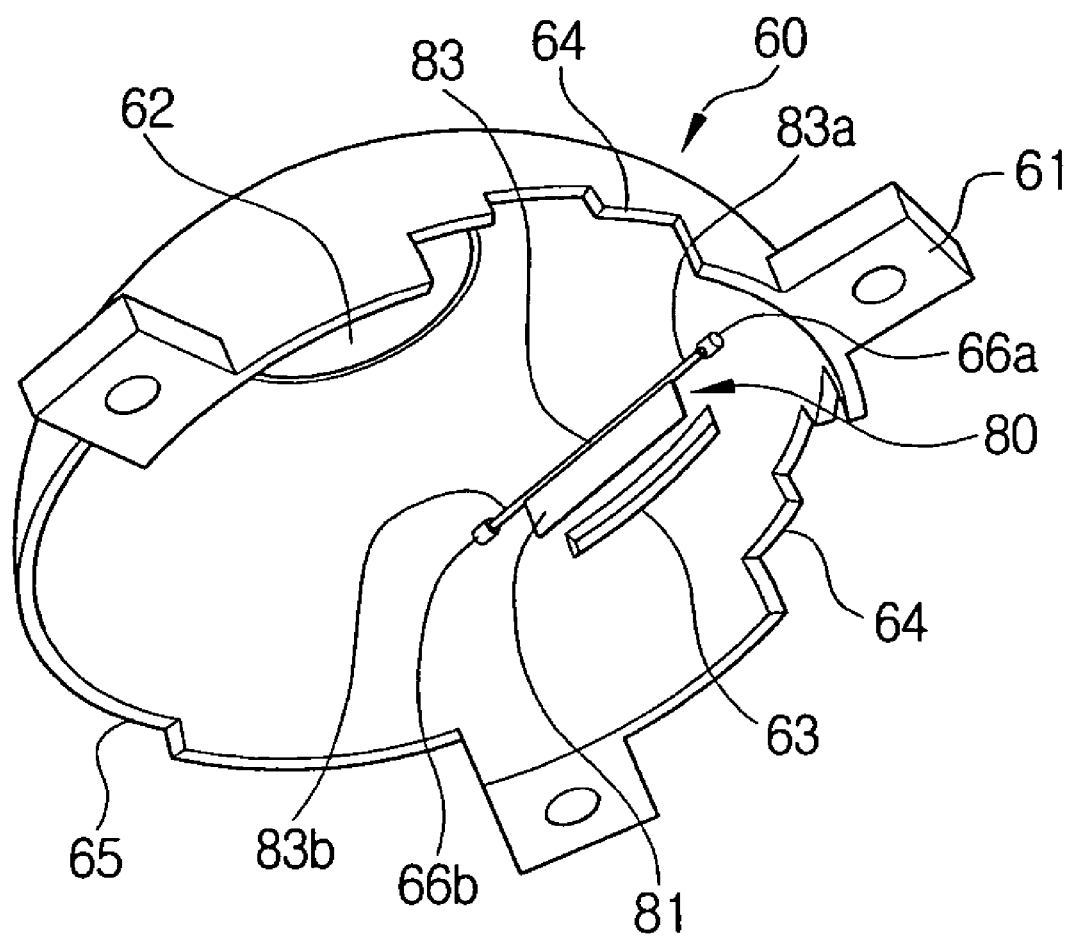
FIG. 6 is a bottom-perspective view of the cover member and a light-blocking unit of FIG. 5.

Referring to FIGS. 5 and 6, a laser scanning device according to another exemplary embodiment of the present invention includes the device body 10, the light source 20 mounted in the device body 10, and the rotating polygonal mirror 30 that deflects light projected from the light source 20. The driving motor 40 rotates the rotating polygonal mirror 30. The circuit board 50 controls the driving motor 40. The cover member 60 covers the rotating polygonal mirror 30 and the light-blocking unit 80. Because the same reference numerals as used in the previous embodiment (FIGS. 1 to 3) refer to the same elements, the structure and operation of the elements are not described again.

The light-blocking unit 80 is pivoted by an air current generated as the rotating polygonal mirror 30 rotates at high speed, thereby transmitting or blocking the light projected through the slit 63. The light-blocking unit 80 includes a blocking plate 81 and a rotary shaft 83.

The blocking plate 81 is pivotably disposed on a projection path of the light to transmit or block the light projected to the slit 63. The blocking plate 81 is preferably formed of a thin member, such as film, to be pivoted by the air current generated by the high-speed rotation of the rotating polygonal mirror 30.

The rotary shaft 83 is connected to the blocking plate 81. The rotary shaft 83 is hingedly connected to the inside of the cover member 60. Both ends 83a and 83b of the rotary shaft 83 are inserted in hinge recesses 66a and 66b, respectively, formed on both sides of the cover member 60.

Figure 7A:
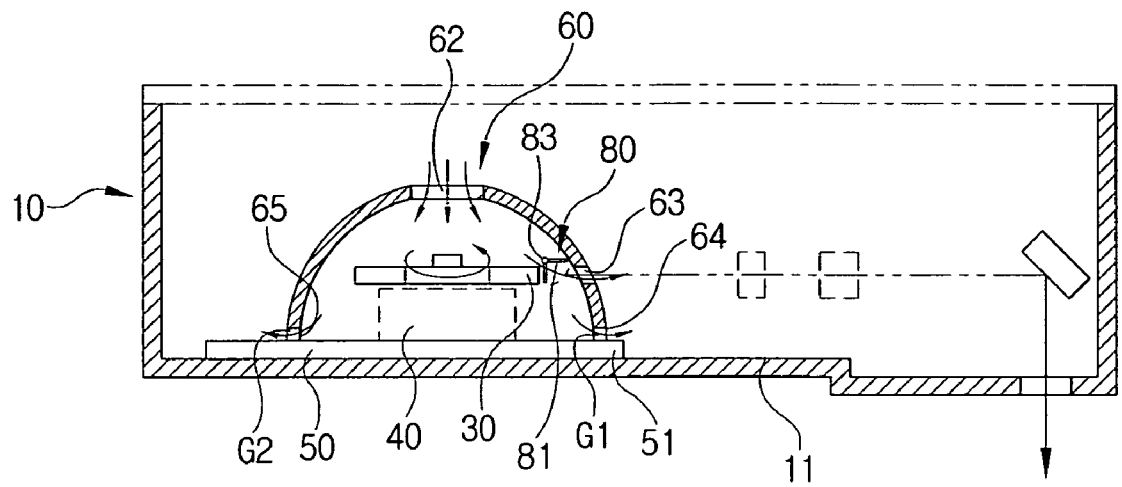
FIGS. 7A and 7B are schematic views of a laser scanning device according to yet another exemplary embodiment of the present invention.

In the above-structured laser scanning device, as shown in FIG. 7A, as the rotating polygonal mirror 30 rotates at high speed, the external air flows into the cover member 60 through the influent hole 62. Because the cover member 60 has a substantially hemispheric shape, the air is guided from the upper part to the lower part and discharged partly through the slit 63 and partly through the gaps G1 and G2 to the outside of the cover member 60. The air current discharged at high speed out of the cover member 60 through the slit 63 rotates the blocking plate 81 upwardly, thereby opening the optical path. Accordingly, the light deflected by the rotating polygonal mirror 30 passes through the slit 63 and the predetermined optical system and enters the photoconductive medium, such as the photoconductive drum.

Figure 7B:
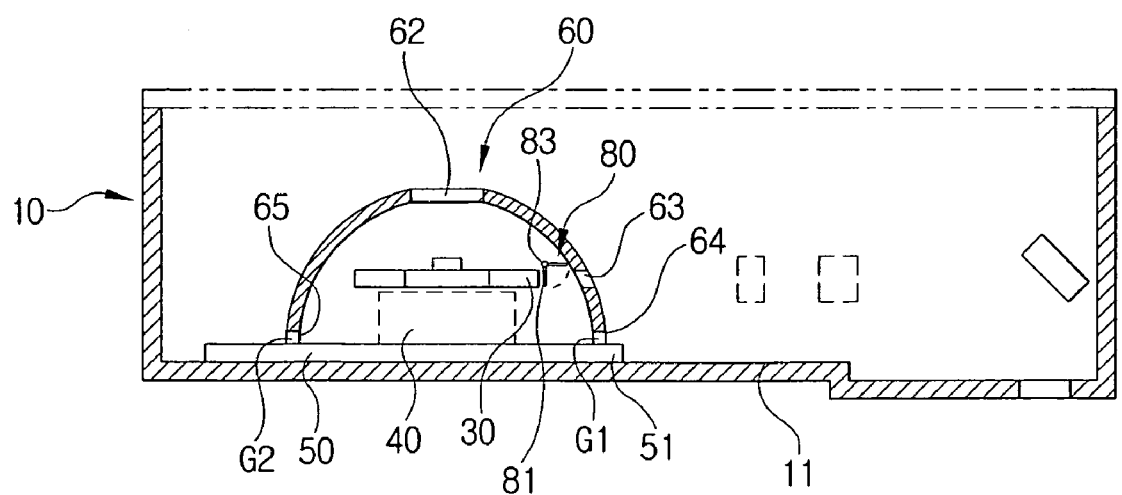

Meanwhile, as shown in FIG. 7B, when the rotating polygonal mirror 30 stops rotating, the air current is not generated any more in the cover member 60 and therefore, the air inside the cover member 60 is not discharged to the outside through the slit 63. Accordingly, the blocking plate 81 of the light-blocking unit 80 returns to an initial position by its own weight, thereby blocking the optical path. As a result, the light deflected by the rotating polygonal mirror 30 cannot pass through the slit 63 nor enter the photoconductive medium, such as the photoconductive drum.

By existence of the light-blocking unit 80 pivotably mounted in the cover member 60, the light may be substantially prevented from being unintentionally projected to the outside. Furthermore, because the light-blocking unit 80 is pivoted by the air current generated by high-speed rotation of the rotating polygonal mirror 30, the laser scanning device does require a dedicated device for operating the light-blocking unit 80.

Figure 8:
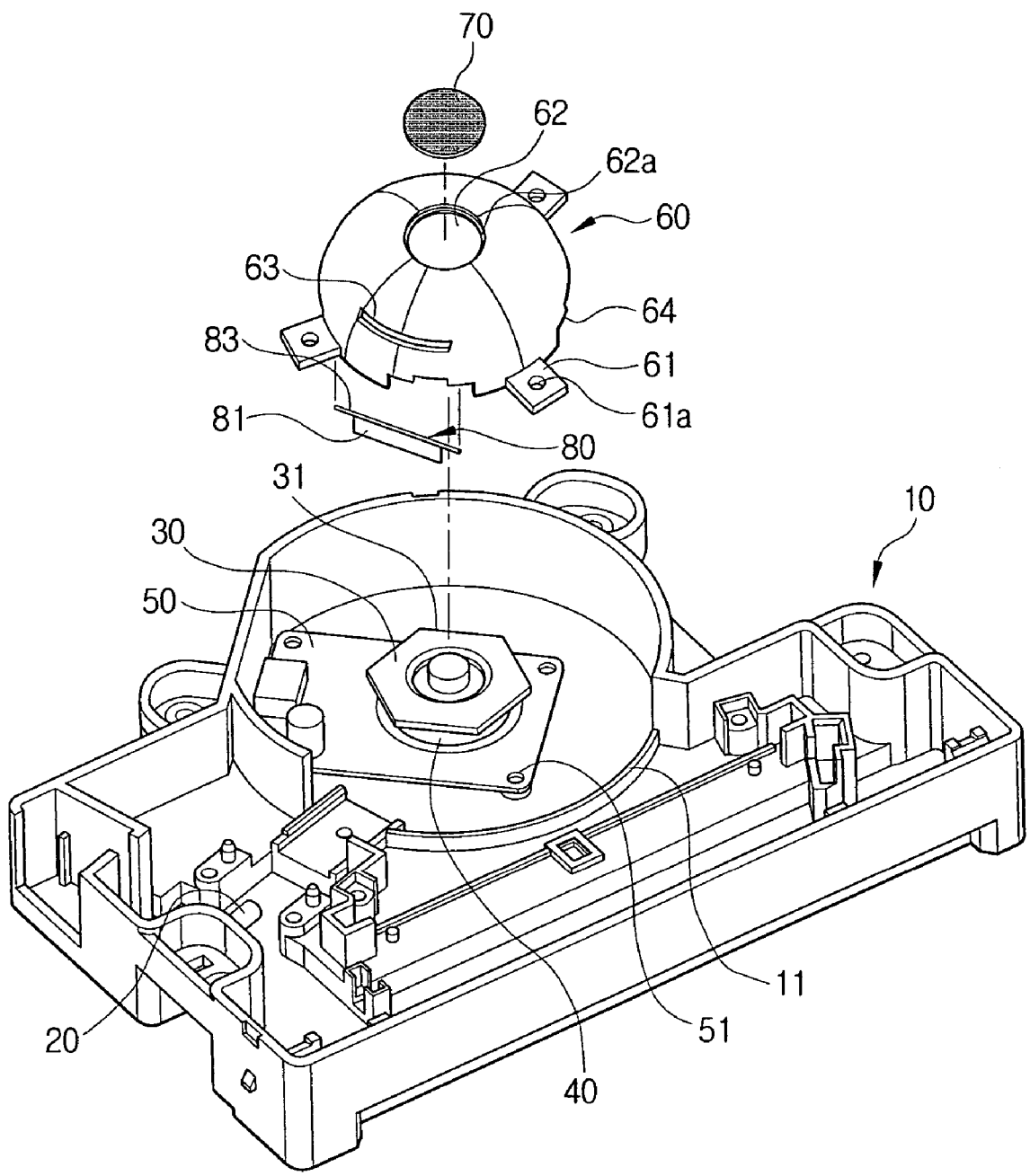
FIG. 8 is an exploded perspective view of a laser scanning device according to still another exemplary embodiment of the present invention.

Referring to FIG. 8, a laser scanning device according to yet another exemplary embodiment of the present invention includes the device body 10, the light source 20 mounted in the device body 10, and the rotating polygonal mirror 30 that deflects light projected from the light source 20. The driving motor 40 rotates the rotating polygonal mirror 30. The circuit board 50 controls the driving motor 40. The cover member 60 covers the rotating polygonal mirror 30, the dust collection unit 70, and the light-blocking unit 80. Because the same reference numerals as used in the previous embodiments (FIGS. 1 to 3, and 5 to 6) refer to the same elements, the structure and operation of the elements are not described again.

In the above-structured laser scanning device, the rotating polygonal mirror 30 is covered by the cover member 60 having a substantially hemispheric shape so that the rotating polygonal mirror 30 may be primarily protected from contamination by external dust.

As the rotating polygonal mirror 30 rotates at high speed, the external air flows in through the influent hole 62 of the cover member 60. Because the external air is filtered by the dust collection member 70, only cleaned air flows into the cover member 60. Therefore, dust floating in the device body 10 may be reduced, thereby substantially preventing contamination of the optical members.

The light-blocking unit 80 is pivoted by an air current generated as the rotating polygonal mirror 30 rotates at high speed, thereby passing through or blocking light projected to the slit 63. The light-blocking unit 80 includes a blocking plate 81 and a rotary shaft 83. By existence of the light-blocking unit 80 pivotably mounted in the cover member 60, the light may be substantially prevented from being unintentionally projected to the outside. Additionally, because the light-blocking unit 80 is pivoted by the air current generated by high-speed rotation of the rotating polygon mirror 30, the laser scanning device does not require a dedicated device for operating the light-blocking unit 80.

As may be appreciated from the above description, contamination of the rotating polygon mirror is substantially prevented by covering the rotating polygonal mirror using the cover member.

Additionally, because the dust collection member disposed in the influent hole formed at the upper end of the cover member catches dust included in the air flowing into the cover member as the rotating polygonal mirror rotates at high speed, contamination of the rotating polygonal mirror by the dust is substantially prevented. Furthermore, the optical members mounted in the device body may be substantially prevented from being contaminated. Also, the amount of the dust may be reduced.

Additionally, the light-blocking unit passing through and blocking the light projected through the slit of the cover member is capable of substantially preventing the light from being unintentionally projected to the outside from the device.

Moreover, because the light-blocking unit is rotated by the air current generated as the rotating polygonal mirror rotates at high speed without requiring a dedicated driving device, the structure of the device may be simplified.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A laser scanning device, comprising:
    a device body;
    a rotating polygonal mirror rotatably mounted in the device body and deflecting a light projected from a light source;
    a cover member mounted in the device body to cover the rotating polygonal mirror, the cover member having a slit for transmitting the light, an influent hole for air flow, and an air current rotating and descending around the rotating polygonal mirror, the slit being open for air to exit therethrough; and
    a dust collection member for filtering dust flowing into the cover member through the influent hole.

2. The laser scanning device of claim 1, wherein
    the cover member has a substantially dome shape with an inner diameter increasing from an upper part toward a lower part, the cover member being vertically non-symmetrical.

3. The laser scanning device of claim 2, wherein
    at least one connection rib is disposed at a lower end of the cover member for connection with a bottom surface of the device body.

4. The laser scanning device of claim 3, wherein
    a circuit board is connected to the bottom surface of the device body to control a driving motor that rotates the rotating polygonal mirror.

5. The laser scanning device of claim 4, wherein
    a first step part at the lower end of the cover member forms a gap between the cover member and the bottom surface of the device body.

6. The laser scanning device of claim 5, wherein
    a second step part at the lower end of the cover member forms a gap between the cover member and the circuit board.

7. The laser scanning device of claim 6, wherein
    the second step part corresponds to a corner of the circuit board.

8. The laser scanning device of claim 1, wherein
    a seating portion of the influent hole receives the dust collection member along a circumference of the seating portion.

9. The laser scanning device of claim 1, wherein
    the dust collection member is made of a porous substance.

10. A laser scanning device, comprising:
    a device body;
    a rotating polygonal mirror rotatably mounted in the device body and deflecting a light projected from a light source;
    a cover member mounted in the device body to cover the rotating polygonal mirror, the cover member having a slit for transmitting the light, an influent hole for air flow, and an air current rotating and descending around the rotating polygonal mirror; and
    a light-blocking unit operated by the air current generated in the cover member, thereby opening and closing the slit.

11. The laser scanning device of claim 10, wherein the light-blocking unit includes
    a blocking plate disposed in a projection path of the light; and
    a rotary shaft connected to the blocking plate and hingedly connected to the cover member at at least one end of the rotary shaft.

12. The laser scanning device of claim 11, wherein
    the cover member has a substantially dome shape with an inner diameter increasing from an upper part toward a lower part, the cover member being vertically non-symmetrical.

13. The laser scanning device of claim 12, wherein
    at least one connection rib is disposed at a lower end of the cover member for connection with a bottom surface of the device body.

14. The laser scanning device of claim 13, wherein a circuit board is connected to the bottom surface of the device body to control a driving motor that rotates the rotating polygonal mirror.

15. The laser scanning device of claim 14, wherein a first step part at the lower end of the cover member forms a gap between the cover member and the bottom surface of the device body.

16. The laser scanning device of claim 15, wherein a second step part at the lower end of the cover member forms a gap between the cover member and the circuit board.

17. The laser scanning device of claim 16, wherein the second step part corresponds to a corner of the circuit board.

18. The laser scanning device of claim 10, wherein a dust collection member filters dust included in the air flowing into the cover member through the influent hole.

19. The laser scanning device of claim 18, wherein a seating portion of the influent hole receives the dust collection member along a circumference of the seating portion.

20. The laser scanning device of claim 18, wherein the dust collection member is made of a porous substance.

* * * * *